United States Patent [19]

Clements

[11] Patent Number: 4,798,048
[45] Date of Patent: Jan. 17, 1989

[54] AUGMENTOR PILOT

[75] Inventor: Thomas R. Clements, Palm City, Fla.

[73] Assignee: United Technologies Corporation, Hartford, Conn.

[21] Appl. No.: 135,773

[22] Filed: Dec. 21, 1987

[51] Int. Cl.[4] .............................................. F02K 3/10
[52] U.S. Cl. ................................. 60/261; 60/39.826; 60/39.83
[58] Field of Search .................. 60/261, 270.1, 734, 60/740, 749, 750, 39.826, 39.83

[56] References Cited

U.S. PATENT DOCUMENTS

| | | | |
|---|---|---|---|
| 1,267,220 | 5/1918 | Heckmann | 273/88 |
| 2,141,948 | 12/1938 | Bruso | 273/88 |
| 2,204,397 | 6/1940 | Barrett | 273/139 |
| 2,667,033 | 1/1954 | Ashwood | 60/39.37 |
| 2,914,912 | 12/1959 | Woll | 60/39.826 |
| 2,925,716 | 2/1960 | Regan et al. | 60/749 |
| 2,929,211 | 3/1960 | Meyer et al. | 60/39.826 |
| 2,944,388 | 7/1960 | Baver | 60/35.6 |
| 2,995,371 | 8/1961 | Nelson | 273/1 GE |
| 3,698,186 | 10/1972 | Bean et al. | 60/749 |
| 3,717,347 | 2/1973 | Hottendorf | 273/1 GE X |

FOREIGN PATENT DOCUMENTS

| | | | |
|---|---|---|---|
| 588847 | 6/1947 | United Kingdom | 60/740 |
| 2114454 | 8/1983 | United Kingdom | 273/1 GE |

Primary Examiner—Louis J. Casaregola
Attorney, Agent, or Firm—Edward L. Kochey, Jr.

[57] ABSTRACT

A truncated diffuser tail cone has a step change to establish a pilot recirculation zone. Air cooled radial spray bars supply fuel to the pilot zone. Heat shields located therein are air cooled, and additional air passes through the central portion of the end of the tail cone.

9 Claims, 2 Drawing Sheets

4,798,048

AUGMENTOR PILOT

TECHNICAL FIELD

The invention relates to augmentors for gas turbine engines and in particular to a pilot and fuel stabilizing arrangement therefore.

BACKGROUND OF THE INVENTION

Advanced augmentors are being required to operate with increasingly high inlet gas temperatures. These augmentors may be subjected to gas temperatures entering the augmentor exceeding 2200 degrees F. Although these high gas temperatures would result in immediate fuel auto ignition, a flame stabilization system is required to obtain and maintain a stable flame during lower inlet temperature conditions that exist at high altitude low aircraft velocity operation.

At these very high levels of inlet temperature conventional augmentor flame holding systems are not suitable. They will experience long term operation at high temperature and will operate at extremely high temperatures when the augmentor is in operation. Even with part load augmentor operation extremely high local temperatures are experienced which should preferably be limited to easily maintained portions of the augmentor arrangement.

Systems introducing fuel upstream of the spray bar provide an ignitable mixture throughout a wide range of the duct. With auto ignition conditions existing conventional spray bars can possibly lead to instability and screech of the flame as it randomly propagates through the mixture. A more controlled rapid burning of the fuel is desirable.

With the limited flow area available and the high velocities existing, unnecessary flow blockage of the duct is detrimental. In addition to generating unacceptably high parasitic pressure losses, high blockage designs are more prone to screech instabilities. Accordingly, a flame holding system which minimizes significant flow blockage is desirable.

SUMMARY OF THE INVENTION

A truncated diffuser tail cone is located centrally within an augmentor duct. This tail cone has a step change at the outer periphery of its downstream facing surface whereby a recirculating gas zone is formed immediately downstream of this step change. A plurality of radial spray bars extend to this area with each spray bar including a cooling air flow passage and a fuel flow passage. Fuel passing through the spray bar is injected not only into the general gas stream for after burning but also includes a pilot injection portion directing fuel into the recirculation zone. A multiplicity of air flow openings through the central portion of the diffuser cone cools the surface and aids in stabilizing the surrounding recirculation zone. Arcuate heat shields at the piloting recirculation zone are air cooled and easily replaceable.

DESCRIPTION OF THE PREFERRED EMBODIMENT

Figure 1:
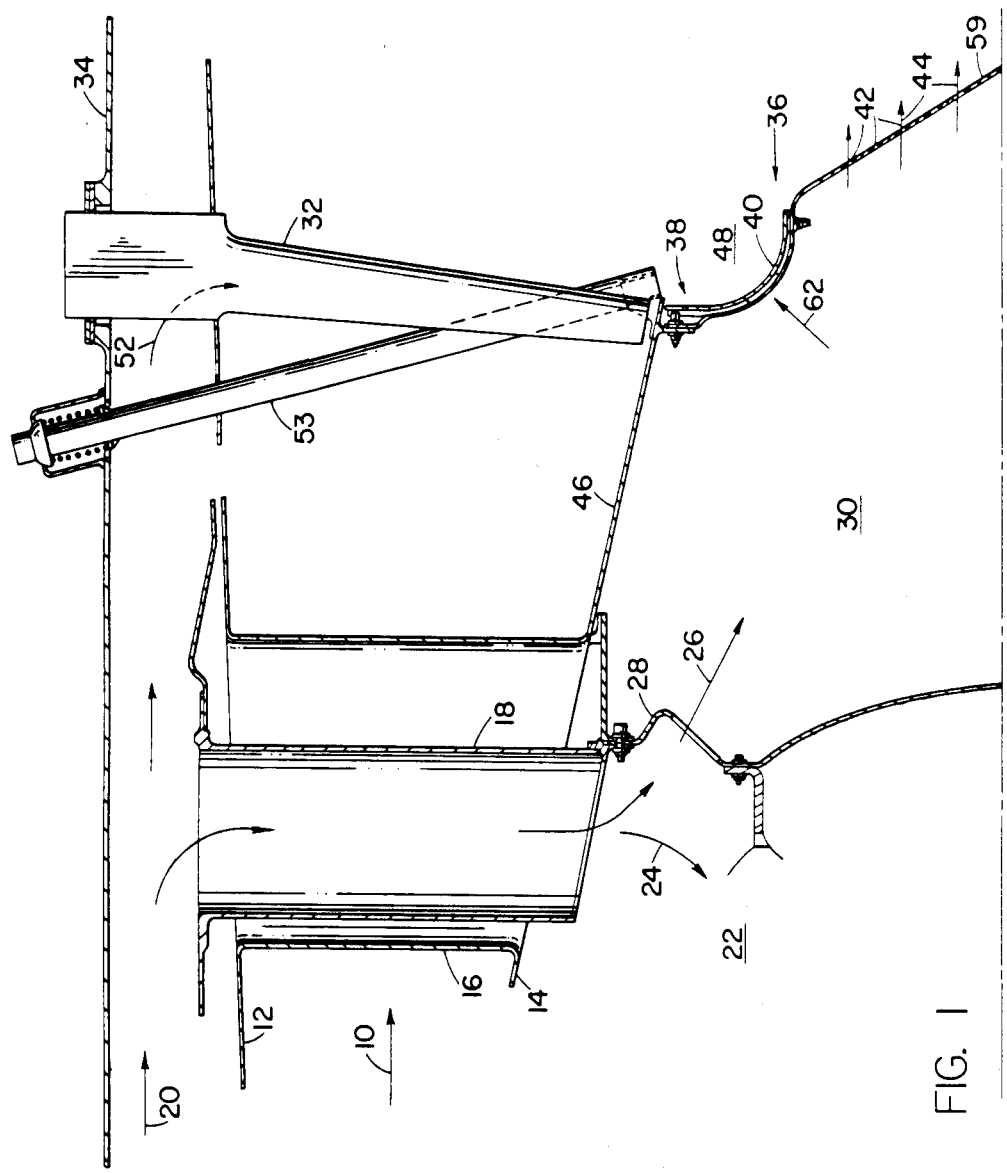
FIG. 1 is a half sectional view through the augmentor duct.
Figure 2:
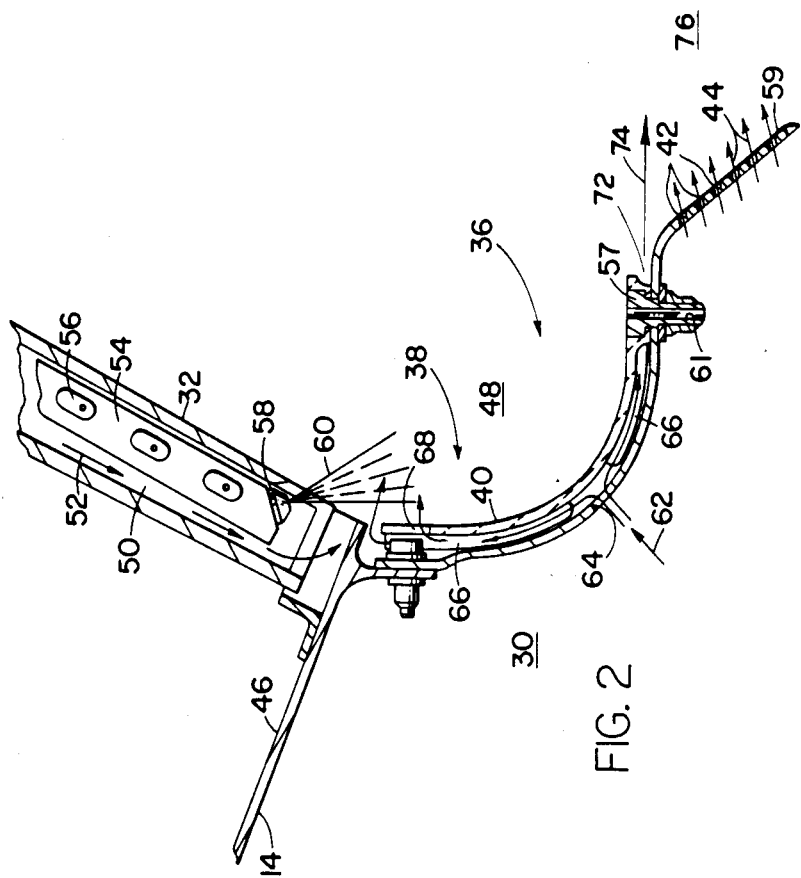
FIG. 2 is a detail of the pilot recirculation zone area.

High temperature gas 10 exiting from a gas turbine passes through an augmentor duct 12 which confines the gas flow into an annular space around a truncated diffuser tail cone 14.

This flow passes over a fairing 16 which supports the tail cone and also provides proper alignment of the gas flow. Within the fairing 16 is a air flow pipe 18 which conveys a portion of cool fan air 20 to the interior 22 of the tail cone. A portion of the air 24 passes in a conventional manner to a bearing compartment (not shown) for cooling and buffering the compartment from heat and contaminates. Another portion of the air 26 passes through a perforated plate 28 to a rearward chamber 30 of the tail cone. This perforated plate provides sufficient restriction to avoid recirculation of hot gases from volume 30 to the upstream volume.

A plurality of sixteen spray bars 32 are supported either from duct 12 or outer casing 34 and extend to a location near the downstream end of tail cone 14. The downwardly facing portion 36 of tail cone 14 has at its outer periphery a step change 38 including a plurality of segmented impervious arcuate plates 40. The central portion 59 of the downstream facing surface has a plurality of openings 42 therein permitting a flow of cooling air 44 to pass therethrough.

The step change from the axial surface 46 of the tail cone 14 provides a recirculation zone 48 immediately downstream of the step change.

Each radial spray bar 32 has an air cooling passage 50 which is supplied with cooling air 52. It also includes a fuel flow passage 54 having a plurality of augmentor injector openings 56 to inject fuel into the gas stream. It further has a pilot injector 58 projecting a conical spray 60 of fuel into recirculation zone 48.

While in many cases auto ignition taken place will be stabilized in this recirculation zone as well as held by the spray bar, an electrical ignitor 53 is supported on duct 12 extending to the area of recirculating zone 48.

Fuel being injected at the same location as the flame holding function performed by spray bar 32 as well as pilot recirculation zone 48 provides a close coupling which increases lean limit stability and prevents fuel auto-ignition induced damage to the flame-stabilization system. Since the fuel has not diffused entirely through the gas stream, it burns relatively smoothly on the flame front without eractic pulsations.

While the use of a step change to establish a recirculation zone is well known, this particular location avoids additional blockage of the annular flow path through which gases 10 are passing while still providing a stable recirculation zone.

The cast segmented panels 40 are supported by a plurality of bolts 57 from the tail cone structure with these bolts being air cooled with opening 61 providing passage for air therethrough. Segmenting the panels allows expansion in this extremely high temperature area and also provides for easy replacement of panels in this high temperature duty area.

A flow of cooling air 62 passes through a plurality of openings 64 impinging against the rear surface of panel 40. This panel preferably has a plurality of fins 66 on the rear side to increase the cooling as the air flows along the panel to exit 68 and 72.

Cooling air 74 injected from slot 72 forms a sheet of high velocity air separating recirculation zone 48 and recirculation 76, thus, substantially preventing combustion in the recirculating zone 76 which could result in unstable operation of the augmentor.

In accordance with normal operation of augmentors only a portion of the entire length of a spray bar or a portion of a plurality of spray bars will be in operation at low load conditions. With the present arrangement low load operation uses the pilot ignition in recirculation zone 48 as well as the adjacent injectors 56. Accordingly, the high temperature operation at part load continues to be focused on this area of the cast panels 40, thereby relieving other augmentor surfaces of extensive high temperature surface.

The pilot flame holder is located remote from the augmentor duct and cooled with fan air ducted into the tail cone cavity 30 through turbine exhaust case struts 16. The segmented pilot heat shields 40 have extended surface cooling with the segments acting to eliminate thermal stresses within the pilot structure. These heat shields are also individually removable without disturbing the rest of the augmentor. The pilot and the spray bars are actively cooled with an arrangement that substantially eliminates thermal stress. This arrangement improves cooling thereby avoiding the use of exotic material and also facilitates ease of repair.

I claim:

1. In an afterburning gas turbine engine an augmentor duct arrangement comprising:
   a duct confining gas flow;
   a truncated diffuser tail cone located centrally within said duct, and having an axial surface and a downstream facing surface;
   a step change with respect to said axial surface at the outer periphery of said downstream facing surface forming a recirculating gas zone immediately downstream of said step change;
   a plurality of radial spray bars extending from said duct to the downstream end of said tail cone;
   each spray bar including a cooling air flow passage and a fuel flow passage; and
   said fuel flow passage having a plurality of augmentor fuel injectors, and a pilot injector directing fuel into said recirculation zone.

2. An augmentor arrangement as in claim 1:
   means for supplying air into said diffuser tail cone; and
   a multiplicity of air flow openings through the central portion of said downstream facing surface, the outer periphery of said downstream facing surface being substantially impervious.

3. An augmentor arrangement as in claim 2:
   said step change comprising an arcuate outwardly facing panel.

4. An augmentor arrangement as in claim 3:
   said step change occurring around the entire periphery of said downstream facing surface.

5. An augmentor arrangement as in claim 4:
   a plurality of arcuate heat shield panels supported within said step change.

6. An augmentor arrangement as in claim 5:
   flow openings through the downstream facing surface behind said heat shield panels, said heat shield panels being spaced from said downstream facing surface whereby the reverse side of said segmented panels is air cooled.

7. An augmentor arrangement as in claim 6:
   a slot between said arcuate shields and said central portion of said downstream facing surface, whereby a flow of air separates said recirculating gas zone downstream of said step change from the zone immediately downstream of said central portion.

8. An augmentor arrangement as in claim 1:
   an igniter supported from said duct and extending to said step change, whereby ignition energy may be supplied to said recirculating zone.

9. An augmentor arrangement as in claim 2:
   a plurality of support struts connecting said tail cone and said duct, and located upstream of said spray bars; and
   said means for supplying air into said diffuser tail cone comprising means for supplying air through said struts into said diffuser tail cone.

* * * * *